(12) United States Patent
Lueck

(10) Patent No.: US 7,788,577 B2
(45) Date of Patent: Aug. 31, 2010

(54) DISPLAYING INFORMATION ON A MOBILE DEVICE

(75) Inventor: Michael F. Lueck, Kitchener (CA)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 11/233,691

(22) Filed: Sep. 23, 2005

(65) Prior Publication Data

US 2007/0073650 A1 Mar. 29, 2007

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 7/00 | (2006.01) |
| G06F 17/30 | (2006.01) |

(52) U.S. Cl. ...................... 715/239; 707/749
(58) Field of Classification Search ................ 715/526, 715/733; 707/9; 709/227
See application file for complete search history.

(56) References Cited

U.S. PATENT DOCUMENTS

| | | | |
|---|---|---|---|
| 6,904,168 B1 | 6/2005 | Steinberg et al. | |
| 7,054,870 B2 * | 5/2006 | Holbrook | 1/1 |
| 7,337,392 B2 * | 2/2008 | Lue | 715/234 |
| 7,434,158 B2 * | 10/2008 | Chi et al. | 715/239 |
| 2002/0083154 A1 * | 6/2002 | Auffray et al. | 709/219 |
| 2003/0014442 A1 * | 1/2003 | Shiigi et al. | 707/513 |
| 2003/0018714 A1 * | 1/2003 | Mikhailov et al. | 709/203 |
| 2004/0125123 A1 * | 7/2004 | Vasudevan | 345/716 |
| 2004/0148571 A1 * | 7/2004 | Lue | 715/514 |
| 2004/0207647 A1 | 10/2004 | Lundin et al. | 370/468 |
| 2004/0250220 A1 | 12/2004 | Kalenius | 715/864 |
| 2005/0015726 A1 * | 1/2005 | Tuominen | 715/733 |
| 2005/0021851 A1 | 1/2005 | Hamynen | 709/245 |

(Continued)

OTHER PUBLICATIONS

CNN.com screen shot [online] Retrieved from the Internet: http://www.cnn.com, Sep. 2, 2005, 3 pages.

(Continued)

Primary Examiner—Mohammad Ali
Assistant Examiner—Patrick A Darno
(74) Attorney, Agent, or Firm—Fish & Richardson P.C.

(57) ABSTRACT

A computer-implemented method for providing hypertext content to a mobile device may include obtaining a network-accessible electronic document that has content and an image, advertising material, or a plurality of similarly formatted hyperlinks. The network-accessible electronic document may be reformatted by collapsing the image, the advertising material, or the plurality of similarly formatted hyperlinks into a first expandable display element. The first expandable display element and at least a portion of the content may be provided for display in a first page on the mobile device. The method may further include receiving input that selects the first expandable display element. The first expandable display element may be reformatted into an image, advertising material, or a plurality of hyperlinks. The image, the advertising material or the plurality of hyperlinks may be provided, along with at least a portion of the content, for display in a second page on the mobile device.

23 Claims, 7 Drawing Sheets

U.S. PATENT DOCUMENTS

| | | | |
|---|---|---|---|
| 2005/0074028 A1 | 4/2005 | Wugofski et al. | 370/468 |
| 2005/0080871 A1 | 4/2005 | Dinh et al. | |
| 2006/0031759 A1* | 2/2006 | Brown et al. | 715/514 |
| 2006/0085731 A1* | 4/2006 | Cui et al. | 715/501.1 |
| 2006/0085743 A1* | 4/2006 | Baudisch et al. | 715/526 |
| 2006/0168101 A1* | 7/2006 | Mikhailov et al. | 709/217 |
| 2006/0277308 A1* | 12/2006 | Morse et al. | 709/227 |
| 2007/0094263 A1* | 4/2007 | Tessman et al. | 707/9 |
| 2007/0226613 A1* | 9/2007 | Tandriono et al. | 715/530 |
| 2008/0294979 A1* | 11/2008 | Chi et al. | 715/234 |

OTHER PUBLICATIONS

International Preliminary Report on Patentability, PCT/US/2006/037106, mailed Apr. 3, 2008, 6 pages.

Baudisch, P. et al. "Collapse-to-zoom: viewing we pages on small screen devices by interactively removing irrelevant content," UIST 04 Proceedings of the 17th annual ACM Symposium on User Interface Software and Technology, Santa Fe, NM Oct. 24-27, 2004, pp. 91-104.

Liqun Chen et al. "Dress: A Slicing Tree Based Web Representation for Various Display Sizes" Internet Citation [Online] Dec. 2002 pp. 1-8.

Bickmore T. W. et al. "Digestor: device-independent access to the World Wide Web" computer Networks and ISDN Systems, North Holland Publishing, Amsterdam, NL, vol. 29, No. 8-13, Sep. 1, 1997, pp. 1075-7082.

Wittenburg, K. et al. "Visual focusing and transition techniques in a treeview for Web information access" Visual Languages, 1997, Proceedings. 1997 IEEE Symposium on Isle of Capri, Italy, Sep. 23-26, 1997, Los Alamitos, (Currently Amended) USA, IEEE Comput. Soc, US pp. 20-27.

Chinese Patent Office, Non Final Office Action, in CN App. No. 200680043630.0, mailed Jul. 10, 16 pages.

\* cited by examiner

DISPLAYING INFORMATION ON A MOBILE DEVICE

TECHNICAL FIELD

This disclosure relates to displaying information on a mobile device; more particularly, the disclosure relates to formatting a network-accessible electronic document by collapsing portions of the document into an expandable display element and providing the expandable display element and other content for display on the mobile device.

BACKGROUND

Vast amounts of information are available on the Internet, the World Wide Web, and on smaller networks. Users of desktop, laptop, and notebook computers have long enjoyed rich content via these networks, like images, audio, video, animation, and other multimedia content. As the number of features available in mobile devices has increased, user expectations of those devices have increased. Users now expect that much of this rich content will also be available from their mobile devices. They expect to have access on the road, in coffee shops, at home and in the office through mobile devices, to information previously available only from a personal computer that was physically connected to an appropriately provisioned network. They want news, stock quotes, and weather reports from their cell phones; email from their personal digital assistants (PDAs); up-to-date documents from their smart phones; and timely, accurate search results from all their devices.

Because displays are typically smaller on mobile devices than, for example, on desktop computers, some of the rich content designed for desktop computer users may not be effectively displayed by the mobile devices.

Therefore, there is a need for methods and systems for effectively providing network-accessible content for display on mobile devices.

SUMMARY

In general, this document discloses methods and systems for displaying information on a mobile device. In some embodiments, the methods and systems may be used to format a network-accessible electronic document by collapsing portions of the document into an expandable display element and providing the expandable display element and other content for display on the mobile device.

In a first general aspect, a computer-implemented method for providing hypertext content to a mobile device may include obtaining a network-accessible electronic document that has content and an image, advertising material, or a plurality of similarly formatted hyperlinks. The network-accessible electronic document may be reformatted by collapsing the image, the advertising material, or the plurality of similarly formatted hyperlinks into a first expandable display element. The first expandable display element and at least a portion of the content may be provided for display in a first page on the mobile device.

In some embodiments, the computer-implemented method may include receiving a request from the mobile device for the network-accessible electronic document before obtaining the network-accessible electronic document. The similarly formatted hyperlinks may be adjacent hyperlinks. The computer-implemented method may further include storing the image, the advertising material or the plurality of similarly formatted hyperlinks and storing an identifier associated with the image, the advertising material or the plurality of similarly formatted hyperlinks. The identifier may be provided with the first expandable display element.

In some embodiments, the computer-implemented method may further include receiving input that selects the first expandable display element. The first expandable display element may be reformatted into an image, advertising material, or a plurality of hyperlinks corresponding to the first expandable display element. The image, the advertising material or the plurality of hyperlinks may be provided, along with at least a portion of the content, for display in a second page on the mobile device. The computer-implemented method may further provide an additional display element associated the with the image, the advertising material or the plurality of hyperlinks.

In some embodiments, the computer-implemented method may further include receiving an identifier along with the input that selects the first expandable display element. The identifier may identify a previously stored image, advertising material or a plurality of hyperlinks, into which the first expandable display element is to be reformatted.

In some embodiments, the computer-implemented method may further include receiving input that selects the additional display element. The image, the advertising material or the plurality of hyperlinks associated with the additional display element may be reformatted. The first expandable display element and at least a portion of the content that was displayed in the second page on the mobile device may be provided for display in a third page on the mobile device.

In some embodiments, the computer-implemented method may further include reformatting the network-accessible electronic document by collapsing another image, other advertising material, or another plurality of similarly formatted hyperlinks into a second expandable display element. The second expandable display element may be provided for display in the first page on the mobile device.

In a second general aspect, a system for providing hypertext content to a mobile device may include an interface that receives input from a mobile device, an automated information gatherer, a transcoder, and an interface. The automated information gatherer may, in response to the received input, obtain a network-accessible document that includes a plurality of similarly formatted hyperlinks or an image or advertising material. The network-accessible document may further include other content. The transcoder may reformat the obtained network-accessible document by collapsing the plurality of similarly formatted hyperlinks or image or advertising material into a first expandable display element. The interface may provide the first expandable display element and at least a portion of the other content for display in a first page on the mobile device.

In some embodiments, the transcoder may reformat the obtained network-accessible document based on a parameter associated with the mobile device. The parameter may be received from the mobile device along with the input. The parameter may be obtained from a Wireless Universal Resource File (WURFL) or from another network-accessible file that provides specification information about various mobile devices. The automated information gatherer may function as a proxy to obtain the network-accessible document on behalf of the mobile device. To reformat the network-accessible document, the transcoder may parse the document to identify a portion to collapse into the first expandable display element. The portion may be selected from a series of list elements in close proximity to each other in the document, an image, or code that causes advertising material to be displayed or retrieved from an advertising material source.

In a third general aspect, a system for providing hypertext content to a mobile device may include an interface that receives input from a mobile device, an automated information gatherer, a means for reformatting a network-accessible document, and an interface. The automated information gatherer may, in response to the received input, obtain a network accessible document having a plurality of similarly formatted hyperlinks or an image or advertising material. The network-accessible document may further include other content. The means for reformatting the network-accessible document may reformat the network-accessible document by collapsing the plurality of similarly formatted hyperlinks or image or advertising material into a first expandable display element. The interface may provide the first expandable display element and at least a portion of the other content for display in a first page on the mobile device.

In some embodiments, the mobile device may be a cellular telephone, a smartphone, a wireless-enabled personal digital assistant, a wireless-enabled vehicle communication device, or a portable mobile device that receives content from the Internet. At least a portion of the obtained network-accessible document may have an HTML (Hypertext Markup Language) format, an XHTML (Extensible HTML) format, an XML (Extensible Markup Language) format, a WML (Wireless Markup Language) format, a Java Script format, an ASP (Active Server Page) format, or another appropriate format. The first expandable display element and at least a portion of the other content may be provided for display in a first page on the mobile device in an XHTML (Extensible Hypertext Markup Language) format, a WML (Wireless Markup Language) format, or another appropriate format.

The details of one or more embodiments are set forth in the accompanying drawings and in the description below. Other features, objects and advantages will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION OF EXEMPLARY EMBODIMENTS

Figure 1A:
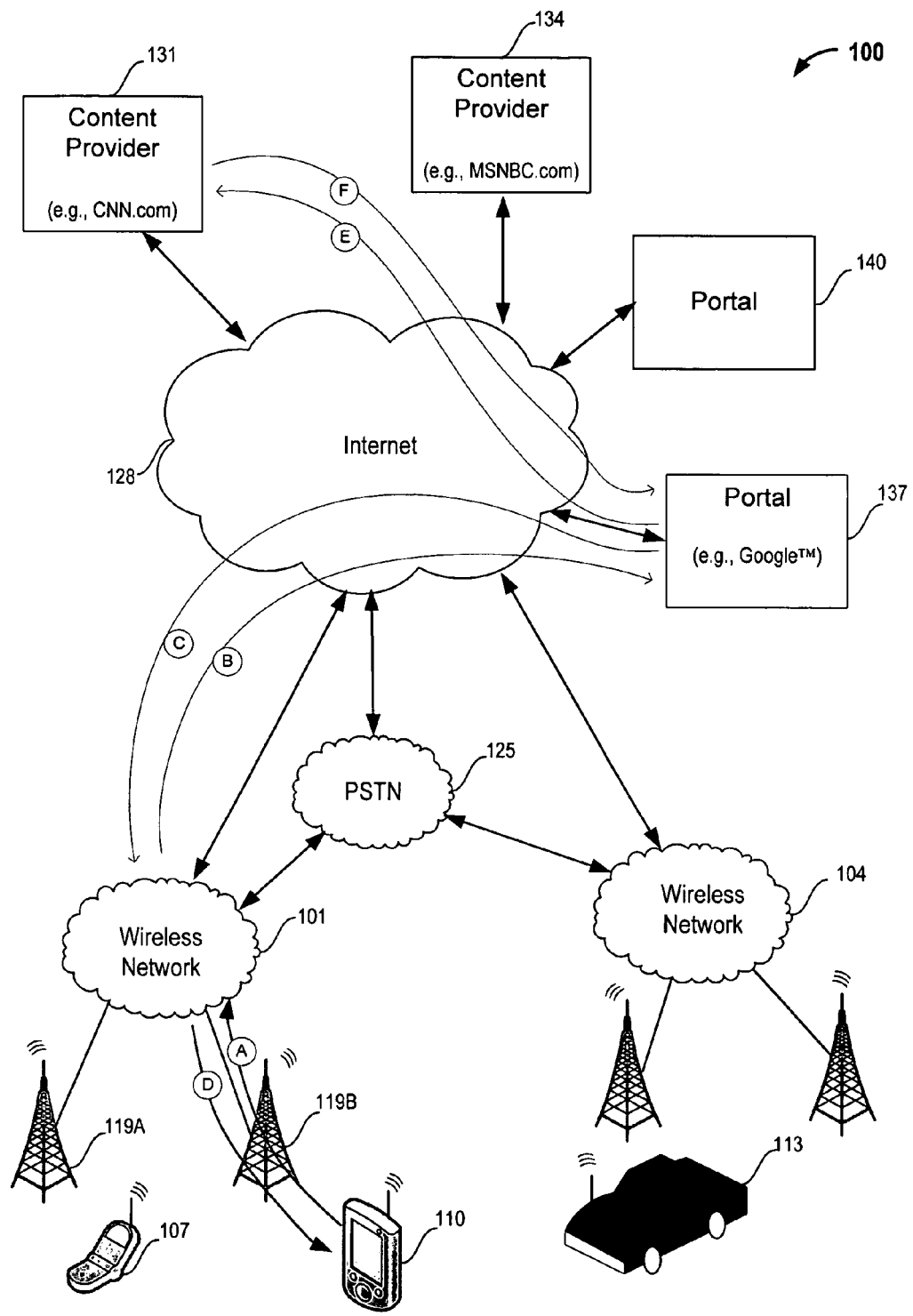
FIG. 1A is a diagram showing an exemplary environment in which mobile devices, such as, for example, wireless devices, and wireless service providers may operate, according to some embodiments.

FIG. 1A is a diagram showing an exemplary environment 100 in which mobile devices, such as, for example, wireless devices, and wireless service providers may operate. The environment allows for the implementation of systems and methods by which one or more portions of a network-accessible document can be identified and then reformatted as one or more collapsed lists so that they may be more easily displayed and navigated on a device having limited display capabilities. For example, in one embodiment described herein, lists of hyperlinks on a Web page may be placed in a collapsed format and thereby displayed to a device under a "plus" sign that could allow a user to expand the collapsed list. Advantageously, such an approach may provide users with much more convenient browsing, since they will not be required to navigate past numerous lengthy menus before finding the relevant content on a web page. Portions may be collapsed independently of other portions, and a collapsed portion may be subsequently expanded and collapsed, independently of other portions.

Within the environment 100, the systems and methods described herein may be used to provide content for display on, for example, a wireless device. The environment 100 may include a plurality of wireless networks 101 and 104. The wireless networks may provide, for example, voice and data services. Data services could include, for example, access to Internet or Web content or to content on a private network, such as a company's intranet. A variety of wireless devices may access the services provided by the wireless networks such as, for example, a wireless cellular telephone 107, a wireless-enabled personal digital assistant (wireless PDA) 110, and a vehicle communication system 113. The wireless networks 101 and 104 may service separate or overlapping geographic areas and may be networks that serve a single carrier or multiple carriers. The voice services may also be delivered as data services, such as by packetizing the voice communications in a manner similar to VoIP transmission.

A wireless network 101 may use wireless towers 119A and 119B to provide data and voice communications and services. As shown, the wireless networks 101 and 104 connect to the public switched telephone network (PSTN) 125 and to the Internet 128. The PSTN 125 may also connect to the Internet 128.

Content providers 131 and 134 and portals 137 and 140 also connect to the Internet 128 and may be accessed by a wireless device through one of the wireless networks 101 or 104. Exemplary content providers 131 and 134 may be online news providers like CNN.com or MSNBC.com, and an exemplary portal 137 may include a search engine, like Google. The exemplary portal 137 may provide only a few services, such as, for example, a search engine or proxy functionality or transcoding services for various devices. For example, the portal 137 may access content from content providers 131 or 134 on behalf of a wireless device, then transcode the content so that it can be effectively displayed on the wireless device. In other embodiments, the exemplary portal 137 may provide a wider array of resources and services that may include, for example, email services, forums, online shopping experiences, and other services.

The arrows labeled with letters in FIG. 1A show exemplary communication paths that may be used by the wireless PDA 110 and the portal 137 during an exemplary session between the two. The various communication paths described below may be traversed multiple times during a single session. One exemplary session may be a search query from the wireless PDA 110 for news, directed to a portal 137, like Google, and subsequent delivery of news content to the wireless PDA 110.

As an example, the user of the wireless PDA 110 may open a search application (not shown) on the wireless PDA 110 to establish a connection with www.google.com. The application may transmit, via path A, a request to receive an initial search page from Google The wireless network 101 may receive the request via the wireless antenna 119B. In some embodiments, the wireless network 101 may send the request directly to the portal via the Internet 128 (path B). In other embodiments (not shown), the request may reach the portal 137 via the PSTN 125 and then the Internet 128. In response to receiving the request for an initial search page, the portal 137 may transmit the page via paths C and D.

In the initial search page, the wireless PDA 110 user may enter a search query, for example "news." The application may transmit the search query to the portal 137, via paths A and B. In some embodiments, the portal 137 may search an internal index or database (shown in FIG. 1B) to identify relevant links to "news." In some embodiments, the portal 137 may execute a real-time search for content outside of an internal database, for example at other content providers. In any case, the portal 137 may send the identified links to the wireless PDA 110 via paths C and D.

In response to receiving the links, the user of the wireless PDA 110 may select one of the identified links—for example, a link to the content provider www.CNN.com, shown in FIG. 1A as exemplary content provider 131. In some embodiments, the user's selection of this link may be sent to the portal 137 via paths A and B, and the portal 137 may act as a proxy for accessing content from www.CNN.com. That is, the selection of the link to www.CNN.com may be sent back to the portal 137 rather than causing a redirection to the content provider 131. More particularly, upon receipt of the user selection, the portal 137 may act as a proxy for the wireless PDA 110 by retrieving content from www.CNN.com 131 via paths E and F. The portal 137 may subsequently provide the retrieved content for display on the wireless PDA 110, as will be described in further detail with reference to FIG. 4.

In some embodiments, the portal 137 may first process the data before providing it to the wireless PDA 110. For example, the portal 137 may transcode the data into a suitable format for display on the wireless PDA 110.

Transcoding may include collapsing certain portions of the retrieved content into smaller display elements. For example, the transcoding process may collapse a series of navigational elements in the retrieved content into an expandable display element. As another example, the transcoding process may collapse an image or advertising content into an expandable display element. The portal 137 may send the transcoded content to the wireless PDA 110 via path C. As will be described in further detail with reference to FIG. 5, the wireless PDA 110 user may subsequently interact with the portal 137 to select the expandable display element and thereby expand navigational or other content that had been previously collapsed. More than one portion of the retrieved content may be collapsed. Thus, the transcoded content may include multiple expandable display elements, each of which may be independently selected and expanded. Moreover, an expanded display element may be subsequently collapsed and expanded a number of times.

Figure 1B:
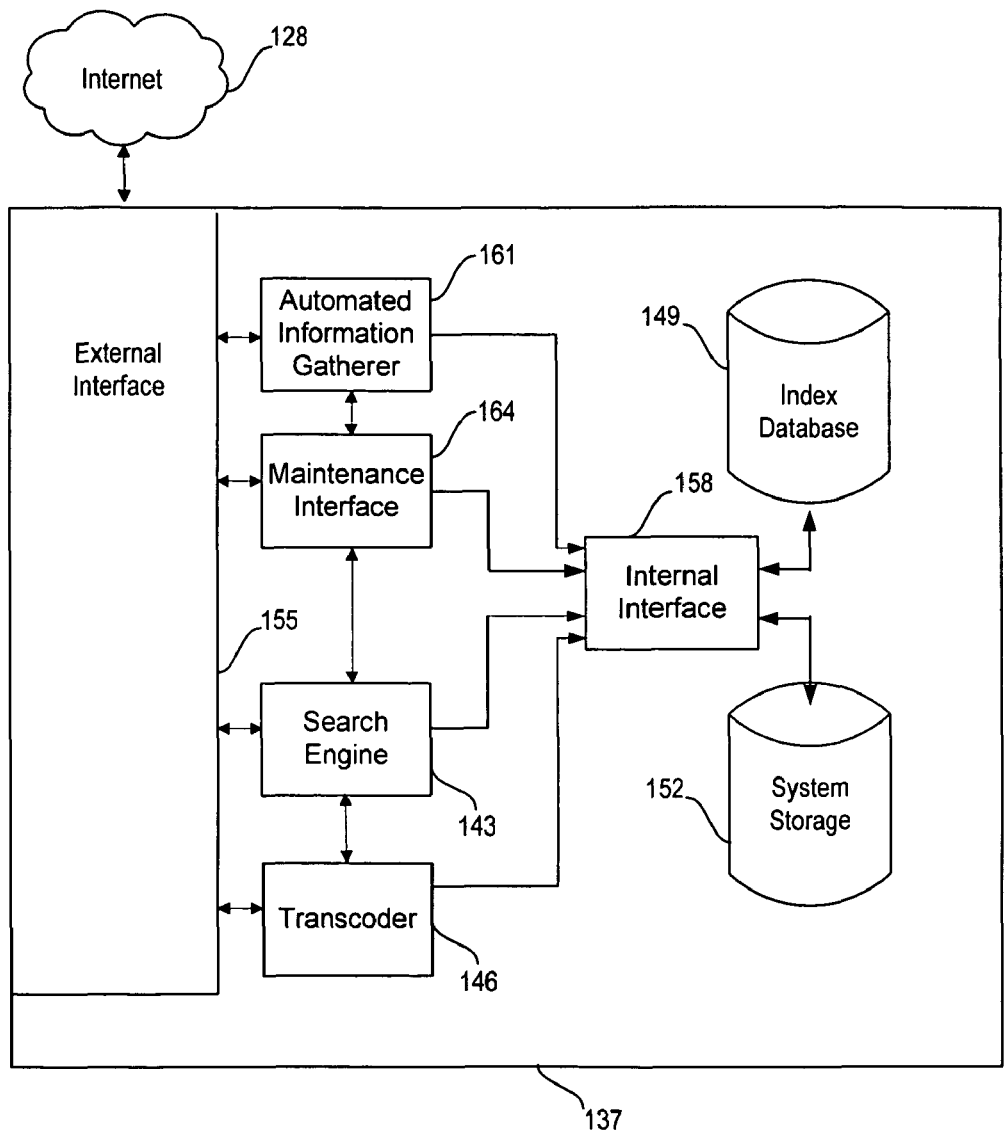
FIG. 1B is a schematic diagram showing details of an exemplary portal, according to some embodiments.

FIG. 1B is a schematic diagram showing additional details of the exemplary portal 137. The portal 137 may receive requests for data from users and generate responses to those requests. In some embodiments, the portal 137 may include an Internet search engine 143. In some embodiments, the portal 137 may provide information such as real-time traffic information, weather forecasts, news, or real-time stock quotes. The information may include text, graphics, animations, audio, video, or other appropriate information. The portal 137 may further include a transcoder 146 to convert information from one format to another.

As shown, the portal 137 is connected to the Internet 128 to communicate with users who access the services provided by the portal 137. The portal 137 may also be connected to other networks (not shown), such as, for example, an internal company network, or a local wireless communication network. The portal 137 may be divided into separate systems to allow for scalability, data integrity, or data security, and it may be connected to the Internet 128 or to another network in any of a variety of ways, as is commonly known.

The exemplary portal 137 includes an index database 149 and system storage 152. The index database 149 may contain data that represents information that the portal 137 provides to users. For example, the portal 137 may comprise a typical Internet search engine 143, and the index database 149 may contain links to information stored on the Internet (e.g., outside of the portal 137). When a user selects a link, the information to which the link points may be provided. As another example, some information referenced by entries in the index database 149 may be stored in the system storage 152. For example, the system storage 152 may "mirror" information for which search reports are regularly received—such as, for example, breaking news stories or weather or traffic information. The system storage 152 may also store various components needed for general operation of various components of the portal 137, such as applications, system parameters and information about users who access the system.

The index database 149 may or may not be cached. For example, the index database 149 may include a separate cached index database (not shown) to support faster access to search results. The system storage 152 may be local to the portal 137, or it may be distributed, such as, for example, in an external server or storage farm (not shown). Within the portal 137, the search engine 143 may operate to produce search results that include information stored in the index database 149 or the system storage 152, in response to search requests from users.

As shown, the portal 137 communicates through an external interface 155 and through an internal interface 158. Through the external interface 155, which may include one or more Web servers, the portal 137 receives requests and transmits responses. Through the internal interface 158, the portal 137 internally routes information to and from the index database 149 and system storage 152. These interfaces are shown as distinct interfaces, but they may be partially or fully combined, or they may include additional interfaces. As an example, the internal interface 158 may comprise interface devices for a high-speed, high-bandwidth network such as SONET, Infiniband or Ethernet, or any suitable communication hardware operating under an appropriate protocol such that the portal 137 can respond to a large number of distinct requests simultaneously. The external interface 155 may comprise network interface cards (NICs) or other communication devices and may similarly include components or interfaces of a high-speed, high-bandwidth network. The precise design of the portal 137 is not critical to this disclosure and could take any suitable form.

The information in the index database 149 may be gathered by an automated information gatherer 161, such as, for example, a crawler or a spider. The information gatherer 161 may continuously or almost continuously obtain new information from sources connected to the Internet 128 or to other network(s) connected to the portal 137. The automated information gatherer 161 may also retrieve content in response to a search query. This information may be provided to the index database 149 or to the system storage 152, or to both. The index database 149 may index data that is accessible from the Internet 128 or from another network. In addition to being added to the index database 149 or system storage 152 in an automated fashion, information may also be manually loaded in or retrieved from the index database 149 or the system storage 152 through a maintenance interface 164. For example, the maintenance interface 164 may allow an administrator of the portal 137 to manually add bulk data to the index database 149 or to the system storage 152.

Data requests, such as data requests from users, may be received and processed through the external interface 155. For example, the external interface 155 may parse requests, and, if necessary, reformat them (e.g., from HTML (hypertext markup language) or text format, to search terms or strings that are compatible with the search engine 143).

The information generated by the search engine 149 in response to a request may be converted to another format by a transcoder 146 in a manner that allows it to be used or displayed by the requesting device. For example, the transcoder 146 may convert data that is in HTML format or an internal format to, in some embodiments, XHTML; after formatting the response, the portal 137 may transmit it to the requesting user via its external interface 155.

Figure 2A:
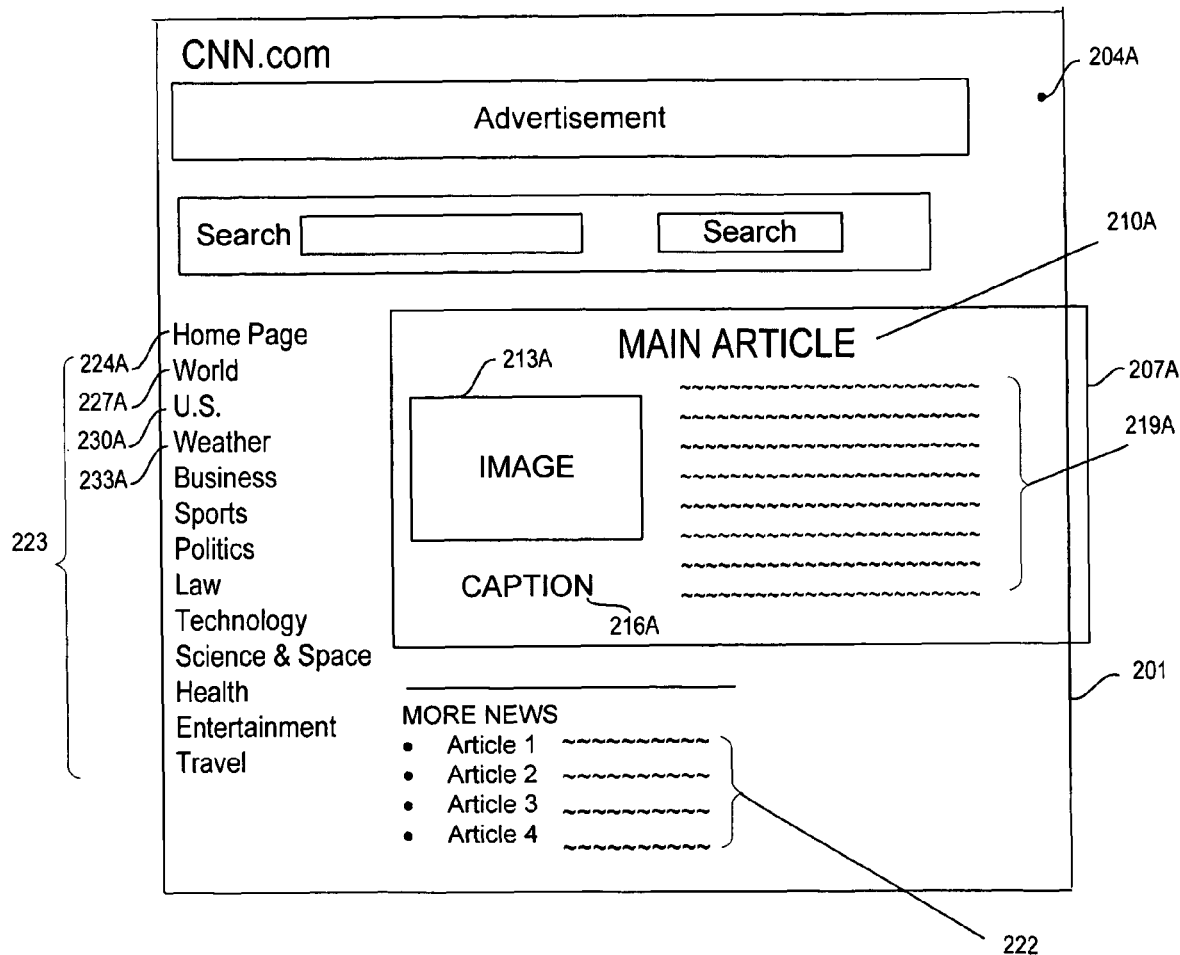
FIG. 2A is a screenshot showing content that may be available from an exemplary content provider, according to some embodiments.

FIG. 2A is a screenshot 201 showing content 204A that may be available from an exemplary content provider 131, such as, for example, CNN.com. As shown, the content 204A may be configured to be displayed on a full-size display, such as would typically be included in a desktop computer system. Further, as shown, the content 204A includes a main article 207A. The main article 207A includes a heading 210A, an image 213A, an image caption 216A, and text 219A. The content 204A includes links 222 to other articles and content and navigation elements, collectively 223, which a user may be able to select to navigate to specifically categorized content. For example, one link 227A may allow a user to navigate to world news; another link 230A may allow the user to navigate to U.S. news; another link 233A may allow the user to navigate to weather content; another link 224A may allow the user to navigate back to a home page, which may provide, for example, a default snapshot of U.S. news. Such menued organization of content is fairly typical of complex Web pages.

For the content 204A to be effectively displayed on a small display, such as would typically be provided by a wireless device like a cell phone or a wireless PDA, it may be advantageous to reformat the content 204A. More particularly, it may be advantageous to identify portions of the content 204A that are less likely to be relevant to the user and to minimize that content, while still allowing the user to subsequently expand and use the minimized content. What is and is not relevant to any particular user or to an average user may be configurable and may change over time.

A few nonlimiting examples of content that may be minimized are now provided. A wireless PDA user may be interested in receiving news from the exemplary content provider 131, CNN.com. Generally, wireless PDA users may be interested in receiving a snapshot of news headlines that are available from the home page, although some wireless PDA users may want to use the navigation elements 233 to access other content. Therefore, it may be advantageous to collapse, by default, the navigation elements 233 into an expandable display element and provide the expandable display element for display with other content, such as with a snapshot of news headlines. In addition, some wireless PDA users may not be able to effectively receive certain images. Therefore, it may also be advantageous to collapse images into an expandable display element. Moreover, some wireless PDA users, because of bandwidth issues, may not be able to effectively receive advertising content. Therefore, it may also be advantageous to collapse advertising material into an expandable display element. In some embodiments, it may be advantageous to collapse other content into an expandable display element, such as lengthy headings, captions, forms, or even portions of a main article—for example paragraphs after the first two. Any content may be amenable to being collapsed and expanded in the manner described in this document.

Figure 2B:
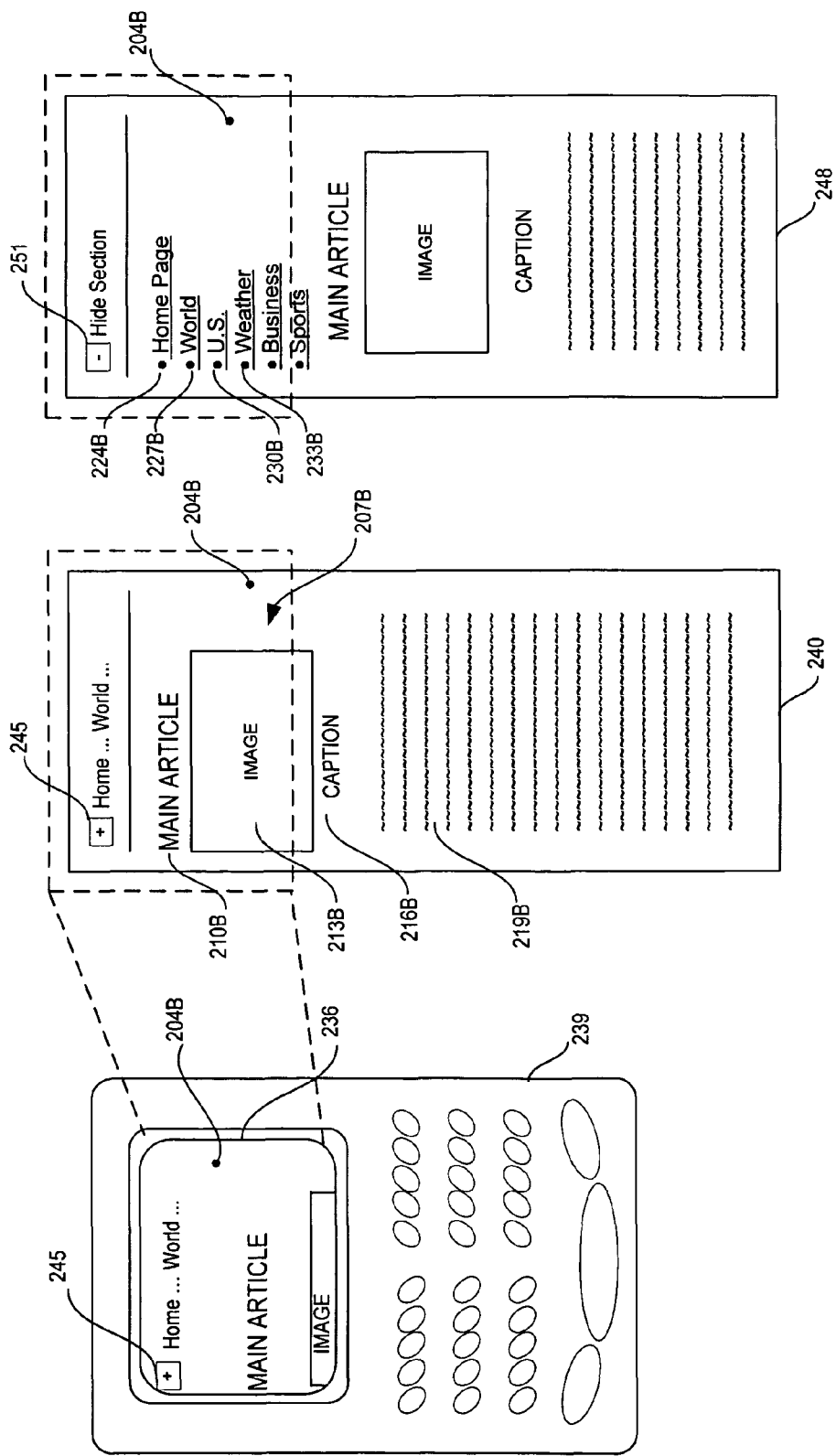
FIG. 2B includes a screenshot showing content as it might appear on a wireless device, according to some embodiments.

FIG. 2B includes a screenshot 236 showing content as it might appear on a wireless device, in accordance with the methods and systems described herein. For example, the screenshot 236 may represent reformatted content 204B as it might appear on a wireless PDA 239. That is, the content of 204B may include portions of the content 204A that are reformatted for display in a small format such as is common in wireless PDAs like the wireless PDA 239. The content 204B may be scrollable. That is, one "page" of information on the wireless PDA may include more information than may be completely displayed at one time by the screen on the wireless PDA 239. Various methods are known for scrolling through such a page of information. For example, the wireless PDA 239 may include a wheel or other physical controls that a user can manipulate to advance the content within a single page. Conceptual view 240 illustrates the information that might be included in a single page of information. The dotted lines illustrate a portion of the single page that might be displayed at one time.

As shown in the screenshot 236 and the conceptual view 240, various elements of the content 204B may correspond to various elements of the content 204A. More particularly, the content 204B may display a reformatted main article 207B with a heading 210B, image 213B, caption 216B, and text 219B.

Also shown in the PDA screenshot 236 and conceptual view 240 is an expandable display element 245 that may represent the collection of navigation elements 223 that are shown in FIG. 2A. The expandable display element 245 may be displayed along with other content, such as the main article 207B. Display of the expandable display element and the other content (e.g., the main article 207B) may be advantageous for users who are familiar with the content 204A when it is displayed on a large screen, as shown in the screenshot 201.

A user of the wireless PDA 239 may be able to select the expandable display element 245 to access the underlying navigational elements. Upon selection by the user, the expandable display element 245 may expand, as shown in conceptual view 248, to include navigation elements. The navigation elements may include for example, a link 227B to world news, a link 230B to U.S. news, a link 233B to weather content, and a link 224B to a home page. As shown, the expanded navigation elements may be displayed with whatever was previously displayed before the user expanded the expandable display element 245 (e.g., the main article 207B). That is, the navigation information, whether it is collapsed into the expandable display element 245 or expanded into individual navigational elements, may be displayed with other content, rather than on a separate page.

Further, expanded content may be provided with an additional display element 251 that the user may be able to select in the same manner as described with reference to the expandable display element 245. Upon selection by the user, the expanded content may be again collapsed. That is, the content may be reformatted to the format shown in the conceptual view 240. Content that was previously displayed may again be displayed as well, along with the expandable display element 245. The expandable display element 245 may subsequently be selected to again expand the content. Thus, various content may be repeatedly expanded or collapsed.

If the menu at 245 is not collapsed for the benefit of the user, the user may be provided with lengthy menus through which they must scroll before getting to the "body" of the Web page. This is particularly true for certain blogs and other Web pages having extensive information in the left margin of the web page. Because information in menus generally includes many hyperlinks, and portable devices may display hyperlinks showing the full URL underlying the hyperlink, the display of the menus can be extremely long and confusing for a user of a portable device. Thus, the collapsed display of the elements has real advantages for a user of the device, making the user more satisfied with their browsing experience, and making the user more likely to review and come back to the particular Web site.

For purposes of illustration, the foregoing describes content with only a single expandable display element. As previously described, content may include multiple expandable display elements. Each expandable display element may be selected independently of the others, and individual elements may be expanded and collapsed multiple times.

Figure 3:
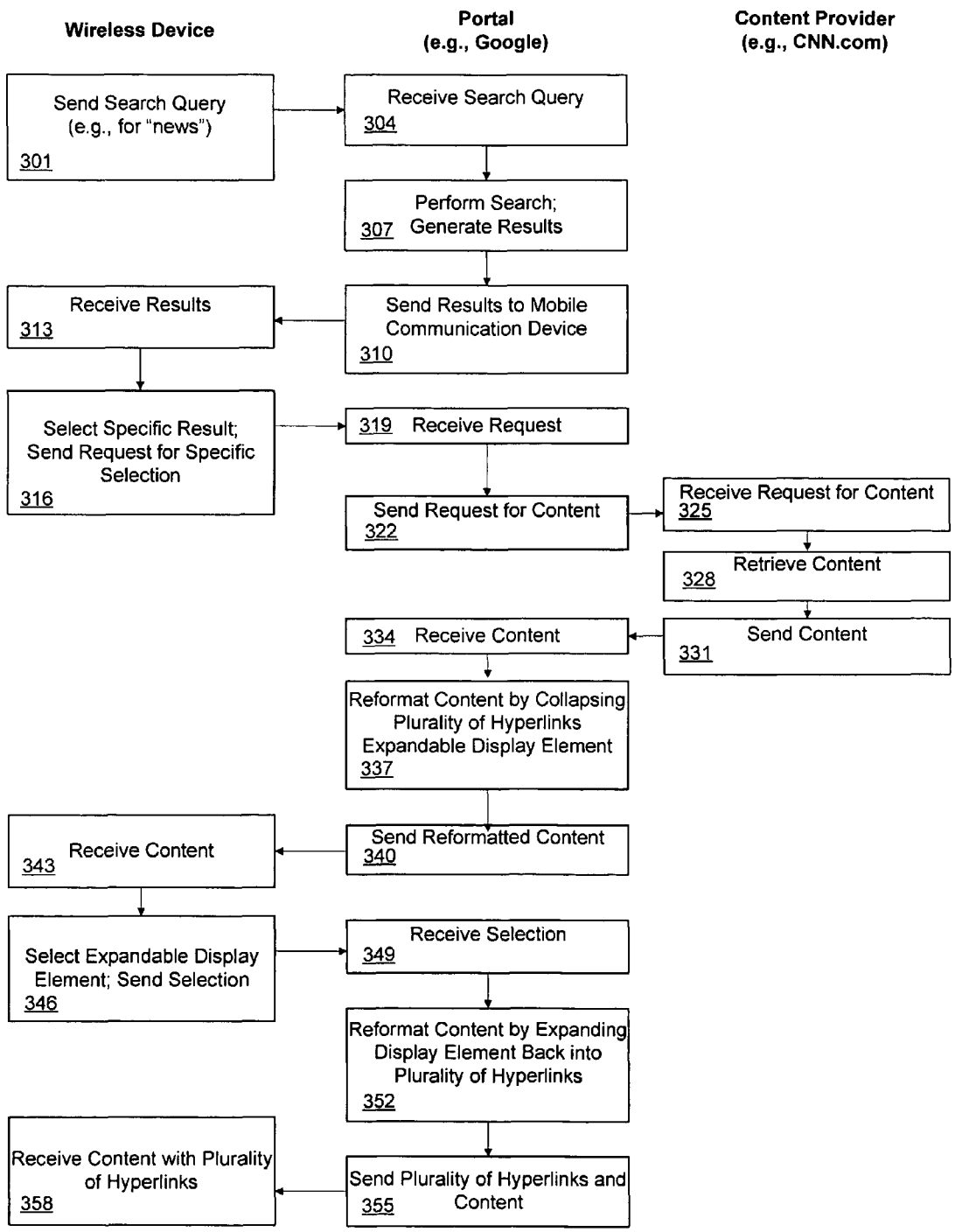
FIG. 3 is a flow diagram illustrating exemplary actions that may be taken to display hypertext content on a wireless device, according to some embodiments.

FIG. 3 is a flow diagram illustrating exemplary actions that may be taken to display, for example, hypertext content in a wireless device. For clarity, the actions are indicated as occurring at a wireless device, a portal and a content provider. However, the actions or similar actions could also be carried out by fewer devices or sites or with a different arrangement of devices or sites.

As shown, a user of a wireless device may enter and send (301) a query (e.g., "news") to a portal. Referring to FIG. 1A, the query may be sent from the wireless PDA 110, via the wireless network 101, to the portal 137. The portal may receive (304) the query and perform (307) a search based on the query. Referring to FIG. 1B, the search may be performed internal to the portal. For example, the exemplary portal 137 may search its internal index database 149, or the portal 137 may use its automated information gatherer 161 to search external sites, such as, for example, the content providers 131 or 134 that are shown in FIG. 1A. From the search, the portal may generate (307) results and send (310) these results to the wireless device. In some embodiments the results may include a list of hyperlinks to content that is responsive to the query. The wireless device may receive (313) the results. A user of the wireless device may select (316) one of the results to access and may send (316) a request for that result to the portal. For example, in some embodiments, the user may select one hyperlink from a list of hyperlinks, and in response, the wireless device may be programmed to send the selection back to the portal.

The portal may receive (319) the request. In some embodiments (not illustrated in FIG. 3) the request may be for information that is contained within the portal. For example referring to the exemplary portal 137 that is shown in FIG. 1B, the requested information may be stored in system storage 152. In this scenario, the portal may reformat (337) this content without performing additional actions. In other embodiments (illustrated in FIG. 3), the request may be for information that is not contained within the portal. For example, the requested information may be content that is accessible from the content provider 131. In this scenario, the portal may perform additional actions, which are now described.

In some embodiments, the portal acts as a proxy for the wireless device. That is, the portal may retrieve, and in some cases reformat, the requested information on behalf of the wireless device. More particularly, the portal may send (322) a request for the content to the content provider 131. The content provider 131, (e.g., CNN.com) may receive (325) the request, retrieve (328) the requested content and send (331) the content to the portal. The portal may then receive (334) the requested content. In addition, the portal may format the content and cache it in anticipation of later requests, or the content provider 131 may use the techniques described herein to format its own content for convenient mobile display.

The portal may reformat (337) the content. For example, the portal may use a transcoder, such as the transcoder 146 that is shown in FIG. 1B, to reformat (337) the content in a form that is readily displayed on the wireless device. In some embodiments, reformatting may include identifying portions of the content that are likely to be less relevant to a wireless device user, (e.g., a series of navigation elements). In some embodiments, the navigation elements may include similarly formatted, possibly adjacent, hyperlinks, such as, for example, the navigation elements 224A, 227A, 230A, and 237A that are shown in FIG. 2A. The portal may reformat (337) the navigation links by collapsing them into a single expandable display element, such as the expandable display element 245 that is shown in FIG. 2B. In some embodiments, reformatting may include identifying an image, advertising material, or any other content, and collapsing it into one or more expandable display elements. An exemplary reformatting process is described in further detail with reference to FIG. 4.

After reformatting (337) any content, the portal may send (340) the reformatted content to the wireless device, and the wireless device may receive (343) the content. A user of the wireless device may view the received content and may select (346) the expandable display element, for example, in order to view, and possibly use its underlying contents to navigate to other information. In some embodiments, the wireless device may be programmed to send (346) the selection of expandable display element to the portal when the user selects it. The portal may reformat (352) the expandable display element. For example, referring to FIG. 2B, the portal may reformat (352) the expandable display element 245 into the series of hyperlinks 224B, 227B, 230B and 233B, and send (355) the series of expanded hyperlinks and content to the wireless device, which receives (358) these expanded hyperlinks and content. Reformatting may include other actions such as, for example, expanding the display element 245 into an image, advertising content, or other content. Moreover, the actions described above may be repeated for more than one expandable display element.

Figure 4:
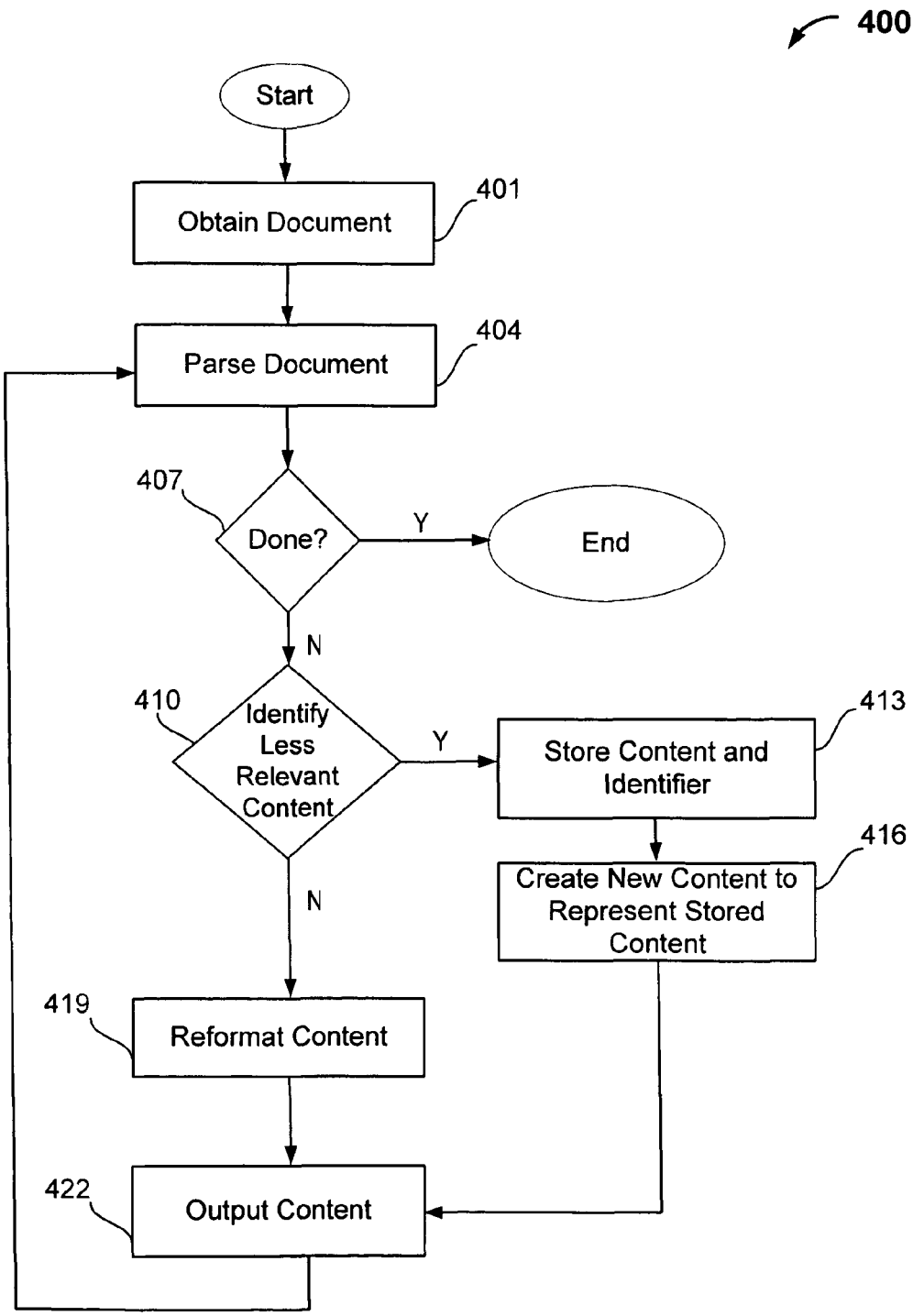
FIG. 4 is a flowchart illustrating an exemplary method for reformatting a network-accessible document for display on a wireless device, according to some embodiments.

FIG. 4 is a flowchart illustrating an exemplary method 400 for reformatting a network-accessible document for display on a wireless device. In an exemplary implementation, the method 400 may be performed by a transcoder, for example the transcoder 146 that is shown in FIG. 11B. The method 400 may be used, for example, to reformat the content 204A to the format 204B. Referring to the flow diagram that is shown in FIG. 3, the method 400 may implement action 337.

According to the method 400, the transcoder 146 may obtain (401) a network-accessible document. The network-accessible document may be a Web page, for example, such as a news page provided by CNN.com. In some embodiments, the network-accessible-document, or portions thereof, may have been stored within the exemplary portal 137 (e.g., in the system storage 152). In some embodiments, the network-accessible document, or portions thereof, may have been retrieved by the portal 137 (e.g., from the content provider 131). Portions of the network-accessible document may be in various formats common to networks, such as, for example, hypertext markup language (HTML), extensible HTML (XHTML), extensible markup language (XML), or other appropriate formats. For purposes of illustration, the network-accessible document may include the content 204A that is shown in FIG. 2A. A portion of exemplary HTML code for displaying the content 204A is shown in Table 1, below.

Upon identifying (410) portions of content that are likely to be less relevant to a wireless device user, the transcoder 146 may store (413) these portions, along with an identifier, such as a globally unique identifier (GUID). The transcoder 146 may store (413) the identified (410) portions in the system

TABLE 1

Exemplary HTML Content

```
<!DOCTYPE HTML PUBLIC "-//W3C//DTD HTML 4.01 Transitional//EN"><html
lang="en"><head><title>CNN.com</title> <meta http-equiv="content-type"
content="text/html; charset=iso-8859-1">
<meta http-equiv="refresh" content="1800">
<link rel="Start" href="/">
<link rel="Search" href="/search/">
<link rel="stylesheet" href="http://i.cnn.net/cnn/.element/ssi/css/1.3/common.css"
type="text/css">
<link rel="stylesheet" href="http://i.cnn.net/cnn/.element/ssi/css/1.3/main.css"
type="text/css">
<link rel="stylesheet" href="http://i.cnn.net/cnn/.element/ssi/css/1.3/other.css"
type="text/css">
<script language="JavaScript 1.2" src="http://i.cnn.net/cnn/.element/ssi/js/1.3/main.js"
type="text/javascript"></script>
...
<td><img src="http://i.a.cnn.net/cnn/.element/img/1.3/searchbar/yahoo.logo.gif"
width="158" height="29" alt=""></td>
    </tr>
    </table><table width="770" cellpadding="0" cellspacing="0" border="0"
id="cnnAboveFold"><colgroup><col width="136"><col width="634"></colgroup><tr
valign="top"><td id="cnnNavBar"> <!-- navbar-->
<ul id="nav">
    <li class="current"><div><a href="/">Home Page</a></div></li>
    <li><div><a href="/WORLD/">World</a></div></li>
    <li><div><a href="/US/">U.S.</a></div></li>
    <li><div><a href="/WEATHER/">Weather</a></div></li>
    <li class="money"><div><a
href="/money/index.html?cnn=yes">Business</a></div></li>
    <li class="sports"><div><a
href="/si/index.html?cnn=yes">Sports</a></div></li>
    <li><div><a href="/POLITICS/">Politics</a></div></li>
    <li><div><a href="/LAW/">Law</a></div></li>
    <li><div><a href="/TECH/">Technology</a></div></li>
    <li><div><a href="/TECH/space/">Science &
Space</a></div></li>
    <li><div><a href="/HEALTH/">Health</a></div></li>
    <li><div><a href="/SHOWBIZ/">Entertainment</a></div></li>
    <li><div><a href="/TRAVEL/">Travel</a></div></li>
</ul>
<div class="cnnNavAd" align="center"><!-- home/roadblock/left.120x90 -->
<script language="JavaScript1.1">
<!--
...
```

In some embodiments, the transcoder 146 may parse (404) the document to identify (410) portions therein that are likely to be less relevant to a user of a wireless device. For example, a particular wireless device may be configured to block access to images or advertisements to facilitate faster loading of content. The wireless device may send configuration information that causes the transcoder 146 to identify (410) images or advertisements within the document and prevent them from being sent to the wireless device. As another example, the transcoder 146 may identify (410) portions of the document that represent navigational or other elements that may be collapsed into a single expandable display element before being sent to the wireless device. More particularly, the transcoder 146 may identify a series of similarly formatted hyperlinks within the document, such as those represented by the exemplary HTML code shown in bold in Table 1. This bold HTML code may correspond to the navigational elements 223 that are shown in FIG. 2A. The same actions described above may be used to identify and collapse any content that is likely to be less relevant to the user.

storage 152 and may create (416) new content to send to the wireless device in place of the identified portions. For example, in place of the series of hyperlinks 223, the transcoder may create an expandable display element, such as the '+' graphic 245 and an accompanying text label that are shown in FIG. 2B.

The label for the graphic 245 may be generated from the collapsed content. For example, in some embodiments, where the graphic 245 represents a collapsed list of navigation elements, the label may be generated from one or more of the list element labels, or portions thereof. In other embodiments, the label may be generated from words that appear close to the collapsed content, such as, for example a heading for a navigation list, or a caption (or portion thereof) corresponding to an image, or a word that appears frequently within advertising content. In other embodiments, the label may be generated from default text, such as "Expand." Many other techniques may be applied to generate a label to provide with the graphic 245.

The transcoder may also reformat (422) content that has not been identified (410). For example, in some embodiments, the transcoder may convert HTML content into XHTML or XML format. An exemplary portion of the HTML content shown in Table 1 that has been reformatted (transcoded) to XHTML format appears in Table 2 below.

TABLE 2

Exemplary Transcoded Content

<?xml version="1.0" encoding="UTF-8"?>
<!DOCTYPE html PUBLIC "-//WAPFORUM//DTD XHTML Mobile 1.0//EN"
"http://www.wapforum.org/DTD/xhtml-mobile 10.dtd"><html
xmlns="http://www.w3.org/1999/xhtml"><head><title>CNN.com</title></head><body>
<a name="top_of_page"></a><a
...
src="/Web/dummy?_RW_IMG=1&_RW_URL=http%3A%2F%2Fi.a.cnn.net%2Fcnn
%2F.element%2Fimg%2F1.3%2Fsearchbar%2Fyahoo.logo.gif"/></div><div><div><a
href="/Web/dummy?_RW_NOIMAGES=0&_RW_URL=http%3A%2F%2Fwww.cnn
.com%2F%3Fnavid%3DT%257C.1.9.1.0."><img
src="/html/images/plus.gif"/></a>Home.. World.. U.S.</div> <div><div>Updated:
4:44 p.m. EDT (20:44 GMT), September 7,
2005</div><div><div style="background-color:#9ACEFF"><hr/>Page 1 /
6<br/>3 <a accesskey="3"
href="/Web/dummy?_RW_NOIMAGES=0&_RW_URL=http%3A%2F%2Fwww.cnn
.com%2F%3F_RW_PAGE%3D1">Next Page</a><br/>2 <a accesskey="2"
href="/Web/dummy?_RW_URL=http%3A%2F%2Fwww.cnn.com%2F%3F_RW_NOIMAGES
%3D1">Hide Images</a><br/>4 <a accesskey="4" href="/x/x">Thumbnail
View</a><br/>5 <a accesskey="5" href="/xhtml">Back to results</a><br/>6 <a
accesskey="6" href="/xhtml">Google Home</a><br/></div></body></html>

New content that the transcoder 146 creates (416) may be combined with content that the transcoder has reformatted (419), and the combined content may be output (422) by the transcoder 146. Referring to Table 2, the bold text may correspond to the graphic 245 that the transcoder 146 created to replace the collapsed navigation elements 233, and all of the content that is shown in Table 2 may be output (422) by the transcoder either to the wireless service or to an intermediate storage location.

Upon being output (422) by the transcoder, the content may be sent to the wireless device. For example, the portal 137 may send this content to the wireless device via the external interface 155, the Internet 128, and the wireless network 101. In some embodiments, content may be sent piecemeal, as it is transcoded. In other embodiments, content may be transcoded in determined quantities before being sent to the wireless device.

Exactly how the content is transcoded and sent may depend on parameters of the wireless device itself. For example, the transcoder 146, or some other element in the portal, may access a database, such as the Wireless Universal Resource File (WURFL), that provides technical specifications for various wireless devices to determine how much content to send the device at one time. The transcoder may configure other parameters associated with providing content to the wireless device based on entries in such a database.

The parsing (404) and identifying (410) processes may be repeated until the transcoder determines (407) that there is no more content to parse (404). In the process, multiple portions of the content may be collapsed. Along with any new content that the transcoder 146 creates (416) and outputs (422) to the wireless device, the transcoder 146 may also send an identifier, such as a GUID, associated with each instance of collapsed or blocked content. The identifier may enable the transcoder 146 to cause the corresponding instance of the collapsed or blocked content to be subsequently expanded or displayed upon receipt of appropriate input from the wireless device. An exemplary method by which collapsed or blocked content may be expanded or displayed by the wireless device is now described with reference to FIG. 5.

Figure 5:
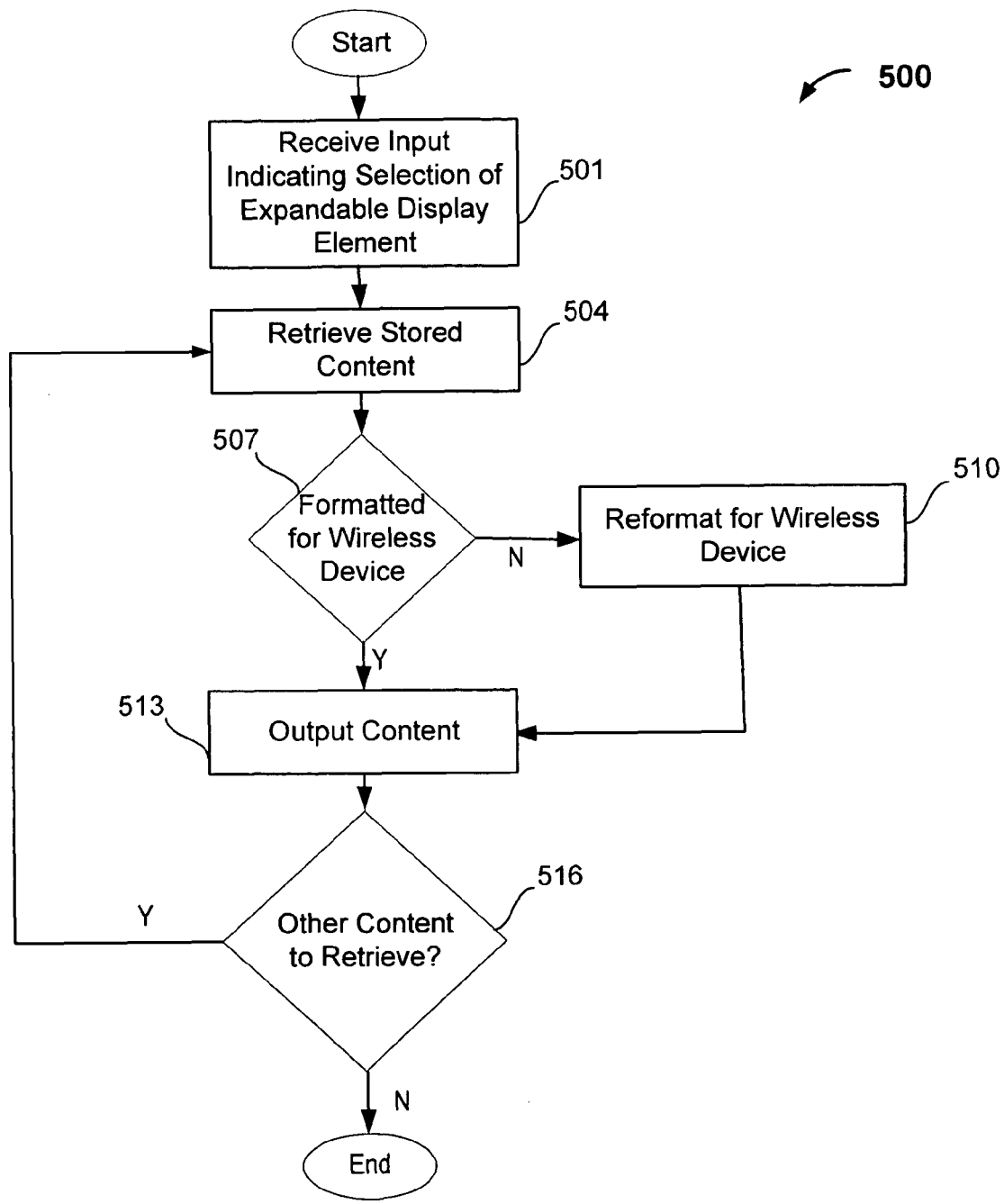
FIG. 5 is a flowchart illustrating an exemplary method for reformatting an expandable display element that may be displayed by a wireless device, according to some embodiments.

FIG. 5 is a flowchart illustrating an exemplary method 500 for reformatting an expandable display element that may be displayed by a wireless device. In an exemplary implementation, the method 500 may be performed by a transcoder, for example the transcoder 146 that is shown in FIG. 1B. By way of example, the method 500 may be used to reformat the expandable display element 245 into the navigational elements 224B, 227B, 230B and 233B that are shown in FIG. 2B. In the flow diagram that is shown in FIG. 3, the method 500 may represent action 352.

In some embodiments, the transcoder 146 receives (501) input from the wireless device indicating a selection of the expandable display element. For example, upon selection of the expandable display element 245 by a user, the wireless device may be programmed to send information to the transcoder 146. In some embodiments, the information may include the identifier that the transcoder stored (413) in the method 400 described above.

The transcoder 146 may retrieve (504) content associated with the identifier. For example, the transcoder may retrieve (504) content that was stored in the system storage 152, such as a series of hyperlinks 223 that were originally included in the content 204A before it was transcoded to have the format of the content 204B. That is, the transcoder 146 may retrieve (504) the series of hyperlinks 223 for display by the wireless device in place of the expandable display element 245. As another example, the transcoder may have initially replaced an image with an expandable display element in response to configuration information indicating that images should be blocked. In response to subsequently receiving (501) input from the wireless device, the transcoder may retrieve (504) the previously blocked image for display by the wireless device.

The transcoder 146 may determine (507) whether the retrieved content is in an appropriate format for display by the wireless device. In the example involving the HTML formatted document that was described above, the identified (410) content (the plurality of hyperlinks 223) may have been stored (413) in HTML format, whereas the other content that was not identified (410) may have been reformatted (419) to XHTML format. The stored (413) HTML content may need to be reformatted (510) to XHTML format before being provided to the wireless device. As another example, an identified (410) image may have been stored (413) in a Joint Photographic Experts Group (JPEG) format. In some embodiments, images to be displayed on the wireless device may require a bit-mapped format. Thus, the stored JPEG image may be reformatted (510) to the bit-mapped format.

Upon being appropriately reformatted (510), if necessary, the content may be output (513) by the transcoder 146. In some embodiments, appropriately formatted content may be sent directly to the wireless device. In other embodiments, the content may be output (513) by the transcoder to intermediate storage, such as system storage 152, before being sent to the wireless device.

The transcoder may determine (516) whether other content should be provided to the wireless device. For example, the transcoder may repeat the actions described above until no further content remains for processing. More particularly, the transcoder may provide content with more than one expandable display element expanded or collapsed. Each expandable display element may be processed independently of the others. That is, content may include both expanded and collapsed display elements, and the methods described with reference to FIG. 4 and FIG. 5 may be performed repeatedly, and in any order relative to each other. Further, the transcoder may track and maintain the status of each expandable display element through several operations. For example, content may include first, second and third expandable display elements. If the first element is collapsed and the second and third elements are expanded, and the user selects the second element to collapse it, the transcoder may provide, in response, content having the first element collapsed, the second element collapsed, and the third element still expanded.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. The systems and methods described herein may be implemented in many different mobile device networks, including by way of example, cellular voice networks; wide area wireless networks such as TDMA, CDMA, W-CDMA, GSM, satellite-based, or EDGE networks; metro area networks such as WiMAX networks; local area networks such as WiFi networks; and any other wireless networks that can deliver voice, data, information, gaming applications, business or utility applications, or other services over a large or small geographical area. Also, the logic flows depicted in the figures may not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for providing hypertext content to a mobile device comprising:

obtaining a network-accessible electronic document having content and a plurality of selectable display elements that comprise at least one of a plurality of images, a plurality of advertising materials, or a plurality of similarly formatted hyperlinks;

identifying the plurality of selectable display elements as a first portion of the network-accessible electronic document to replace with a first substitute display element, wherein the first substitute display element comprises a singular display element that replaces the plurality of selectable display elements identified as the first portion of the network-accessible electronic document for display by the mobile device;

generating, by a computer system, first code for creating the first substitute display element based upon the identified first portion of the network-accessible electronic document, wherein the first substitute display element is smaller in display size than the identified first portion of the network-accessible electronic document, and wherein the first substitute display element includes content to be displayed by the mobile device that is representative of the identified first portion and an associated link that is configured to transmit a request for display of the identified first portion upon being selected;

reformatting, by the computer system and at a transcoder that is separate from the mobile device, the network-accessible electronic document by replacing code for the identified first portion of the network-accessible electronic document with the generated first code for the first substitute display element having an appearance that is graphically independent of the corresponding identified first portion of the network-accessible electronic document; and providing, from the computer system and for receipt by the mobile device, the generated first code for the first substitute display element and at least a portion of the content of the network-accessible electronic document for display in a first page on the mobile device, wherein the plurality of selectable display elements identified as the first portion are maintained at the computer system and are provided to the mobile device in response to a user of the mobile device selecting the associated link that is part of the generated first code.

2. The computer-implemented method of claim 1, further comprising receiving a request from the mobile device for the network-accessible electronic document before obtaining the network-accessible electronic document.

3. The computer-implemented method of claim 1, wherein the similarly formatted hyperlinks are adjacent hyperlinks.

4. The computer-implemented method of claim 1, further comprising:

storing the identified first portion of the network-accessible electronic document; and storing an identifier associated with the identified first portion of the network-accessible electronic document, wherein the stored identifier is used by the associated link of the first substitute display element to request display of the identified first portion of the network-accessible electronic document.

5. The computer-implemented method of claim 4, further comprising providing the identifier with the first substitute display element as part of the associated link.

6. The computer-implemented method of claim 1, further comprising:

receiving input that selects the first substitute display element;

in response to receiving the input that selects the first substitute display element, reformatting the first substitute display element into the identified first portion by replacing the generated first code for the first substitute display element with the code for the identified first portion of the network-accessible electronic document;

providing the identified first portion of the network-accessible electronic document and the portion of the content of the network-accessible electronic document in a format in which it was provided for display in the first page, for display in a second page on the mobile device; and further providing an additional display element that is different than the first substitute display element and that is associated with the identified first portion of the network-accessible electronic document.

7. The computer-implemented method of claim 6, further comprising receiving an identifier along with the input that selects the first substitute display element, the identifier identifying a previously stored image, advertising material or a plurality of hyperlinks that comprises the identified first portion of the network-accessible electronic document, into which the first expandable display element is to be reformatted.

8. A computer-implemented method for providing hypertext content to a mobile device comprising:

obtaining a network-accessible electronic document having content and at least one of an image, advertising material, or a plurality of similarly formatted hyperlinks;

identifying the at least one of the image, the advertising material, or the plurality of similarly formatted hyperlinks as a first portion of the network-accessible electronic document to replace with a first substitute display element, wherein the first substitute display element replaces the identified first portion of the network-accessible electronic document for display by the mobile device;

generating, by a computer system, first code for creating the first substitute display element based upon the identified first portion of the network-accessible electronic document, wherein the first substitute display element is smaller in display size than the identified first portion of the network-accessible electronic document, and wherein the first substitute display element includes content to be displayed by the mobile device that is representative of the identified first portion and an associated link that is configured to transmit a request for display of the identified first portion upon being selected;

reformatting, by the computer system and at a transcoder that is separate from the mobile device, the network-accessible electronic document by replacing code for the identified first portion of the network-accessible electronic document with the generated first code for the first substitute display element having an appearance that is graphically independent of the corresponding identified first portion of the network-accessible electronic document;

providing the generated first code for the first substitute display element and at least a portion of the content of the network-accessible electronic document for display in a first page on the mobile device;

receiving input that selects the first substitute display element;

in response to receiving the input that selects the first substitute display element, reformatting the first substitute display element into the identified first portion by replacing the generated first code for the first substitute display element with the code for the identified first portion of the network-accessible electronic document;

providing the identified first portion of the network-accessible electronic document and the portion of the content of the network-accessible electronic document in a format in which it was provided for display in the first page, for display in a second page on the mobile device; and further providing an additional display element that is different than the first substitute display element and that is associated with the identified first portion of the network-accessible electronic document;

receiving input that selects the additional display element;

in response to receiving the input that selects the additional display element, reformatting the identified first portion of the network-accessible electronic document associated with the additional display element; and providing the first substitute display element and at least a portion of the content that was displayed in the second page in the mobile device for display in a third page on the mobile device.

9. The computer-implemented method of claim 1, further comprising:

identifying another plurality of selectable display elements as a second portion of the network-accessible electronic document to replace with a second substitute display element, wherein the other plurality of selectable display elements comprises at least one of another plurality of images, another plurality of advertising materials, or another plurality of similarly formatted hyperlinks, and wherein the second substitute display element replaces the identified second portion of the network-accessible electronic document for display by the mobile device;

generating second code for creating the second substitute display element based upon the identified second portion of the network-accessible electronic document, wherein the second substitute display element is smaller in display size than the identified second portion of the network-accessible electronic document, and wherein the second substitute display element includes content to be displayed by the mobile device that is representative of the identified second portion and an associated link that is configured to transmit a request for display of the identified second portion upon being selected;

reformatting the network accessible electronic document by replacing code for the identified second portion of the network-accessible electronic document with the generated second code for the second substitute display element; and providing the second substitute display element for display in the first page on the mobile device.

10. A system for providing digital content to a mobile device, the system comprising:

an interface that receives input from a mobile device;

an automated information gatherer that, in response to the received input, obtains a network-accessible document comprising a plurality of selectable display elements, wherein the plurality of selectable display elements comprises at least one of a plurality of similarly formatted hyperlinks or a plurality of images or a plurality of advertising materials, the network-accessible document further comprising other content;

a transcoder that is separate from the mobile device and that is stored on a server system and configured to:

identify the plurality of selectable display elements as a first portion of the network-accessible electronic document to replace with a first substitute display element, wherein the first substitute display element comprises a singular display element that replaces the plurality of selectable display elements identified as the first portion of the network-accessible electronic document for display by the mobile device, generate first code for creating the first substitute display element based upon the identified first portion of the network-accessible electronic document, wherein the first substitute display element is smaller in display size than the first portion of the network-accessible electronic document, and wherein the first substitute display element includes content to be displayed by the mobile device that is representative of the identified first portion and an associated link that is configured to transmit a request for display of the identified first portion upon being selected, and reformat the obtained network-accessible document by replacing code for the identified first portion of the network-accessible electronic document with the generated first code for the first substitute display element having an appearance that is graphically independent of the corresponding identified first portion of the network-accessible electronic document;

and an interface that provides the generated code for the first substitute display element and at least a portion of the other content for display in a first page on the mobile device, wherein the plurality selectable display elements identified as the first portion are provided to the mobile device in response to a user of the mobile device selecting the associated link that is part of the generated first code.

11. The system of claim 10, wherein the transcoder reformats the obtained network-accessible document based on a parameter associated with the mobile device.

12. The system of claim 11, wherein the parameter is received from the mobile device along with the input.

13. The system of claim 11, wherein the parameter is obtained from the group consisting of a Wireless Universal Resource File (WURFL) and another network-accessible file that provides specification information about various mobile devices.

14. The system of claim 10, wherein the automated information gatherer functions as a proxy to obtain the network-accessible document on behalf of the mobile device.

15. The system of claim 10, wherein, to reformat the obtained network-accessible document, the transcoder parses the document to identify the first portion of the network-accessible document to replace with the first substitute display element.

16. The system of claim 15, wherein the first portion is selected from the group consisting of a series of list elements in close proximity to each other in the document, an image, and code that causes advertising material to be displayed or retrieved from an advertising material source.

17. A system for providing digital content to a mobile device, the system comprising:

an interface that receives input from a mobile device;

an automated information gatherer that, in response to the received input, obtains a network-accessible document comprising a plurality of selectable display elements, wherein the plurality of selectable display elements comprises at least one of a plurality of similarly formatted hyperlinks or a plurality of images or a plurality of advertising materials, the network-accessible document further comprising other content;

a means, that is separate from the mobile device and implemented on a server system, for reformatting the obtained network-accessible document by:

identifying the plurality of selectable display elements as a first portion of the network-accessible electronic document to replace with a first substitute display element, wherein the first substitute display element comprises a singular display element that replaces the plurality of selectable display elements identified as the first portion of the network-accessible electronic document for display by the mobile device, generating first code for creating the first substitute display element based upon the identified first portion of the network-accessible electronic document, wherein the first substitute display element is smaller in display size than the identified first portion of the network-accessible electronic document, and wherein the first substitute display element includes content to be displayed by the mobile device that is representative of the identified first portion and an associated link that is configured to transmit a request for display of the identified first portion upon being selected, and reformatting the obtained network-accessible electronic document by replacing code for the identified first portion of the network-accessible electronic document with the generated first code for the first substitute display element having an appearance that is graphically independent of the corresponding identified first portion of the network-accessible electronic document; and and an interface that provides the generated code for the first substitute display element and at least a portion of the other content for display in a first page on the mobile device, wherein the plurality of selectable display elements identified as the first portion are provided to the mobile device in response to a user of the mobile device selecting the associated link that is part of the generated first code.

18. The system of claim 17, wherein the mobile device is selected from the group consisting of a cellular telephone, a smartphone, a wireless-enabled personal digital assistant, a wireless-enabled vehicle communication device, and a mobile device that receives content from the Internet.

19. The system of claim 17, wherein at least a portion of the obtained network-accessible document has a format selected from the group consisting of HTML (Hypertext Markup Language), XHTML (Extensible HTML), XML (Extensible Markup Language), WML (Wireless Markup Language), Java Script, and ASP (Active Server Page) format.

20. The system of claim 17, wherein the first substitute display element and at least a portion of the other content is provided for display in a first page on the mobile device in a format selected from the group consisting of XHTML (Extensible Hypertext Markup Language) and WML (Wireless Markup Language).

21. A computer-implemented method of providing hypertext content to a mobile device comprising:

obtaining a network-accessible electronic document having content and a navigation menu comprising a plurality of hyperlinks;

identifying the navigation menu for replacement by a substitute display element, wherein the substitute display element comprises a singular display element that replaces the plurality of hyperlinks comprising the navigation menu in the network-accessible electronic document for display by the mobile device;

generating, by a computer system, code for creating the substitute display element based upon the navigation menu, wherein the substitute display element is smaller in display size than the navigation menu, and wherein the substitute display element includes content to be displayed by the mobile device that is representative of the navigation menu and an associated link that is configured to transmit a request for display of the navigation menu upon being selected;

reformatting, by a computer system and at a transcoder that is separate from the mobile device, the network-accessible electronic document by replacing code for the navigation menu with the generated code for the substitute display element for display in place of the plurality of hyperlinks of the navigation menu; and providing, from the computer system and for receipt by the mobile device, the generated code for the substitute display element and at least a portion of the content of the network-accessible electronic document for display on the mobile device in a single page of information, wherein the navigation menu is maintained at the computer system and is provided to the mobile device in response to a user of the mobile device selecting the associated link that is part of the generated code;

wherein providing the generated code for the substitute display element comprises configuring the substitute display element such that selection in the mobile device of the substitute display element causes the single page of information to be updated, wherein the updated single page of information includes the plurality of hyperlinks in the navigation menu displayed with the portion of the content on the mobile device.

22. The computer-implemented method of claim 21, wherein each of the plurality of hyperlinks in the navigation menu is configured to cause, upon its selection, another portion of the network-accessible document or a different network-accessible document to be displayed on the mobile device.

23. A computer-implemented method comprising:

receiving, at a server system from a client computing device, a request for a network-accessible electronic document;

obtaining, by the server system, the requested network-accessible electronic document, wherein the electronic document includes a plurality of items to be displayed as part of the document and wherein the plurality of items belong to a group of items that share a common characteristic;

identifying, by the server system, the plurality of items in the electronic document for replacement based upon a determination that the plurality of items have below a threshold degree of relevance to a user of the client computing device in view of other content included in the electronic document;

storing, by the server system, the plurality of items for future retrieval by the client computing device;

generating, by the server system, code for a hyperlink that represents the plurality of items, wherein the code for the hyperlink is configured such that selection of the hyperlink by the user of the client computing device causes the client computing device to request the stored plurality of items;

providing, by the server system, the generated code to the client computing device, wherein the generated code causes the hyperlink to be displayed on the client computing device as part of the electronic document and in place of the plurality of items;

receiving, at the server system from the client computing device, an indication that a user of the client computing device has selected the hyperlink; and in response to receiving the indication from the client computing device, providing, by the server system to the client computing device, code for displaying the plurality of items on the client computing device as part of the electronic document and in place of the plurality of items.

* * * * *